(12) United States Patent
Onufryk et al.

(10) Patent No.: US 7,634,774 B2
(45) Date of Patent: Dec. 15, 2009

(54) SYSTEM AND METHOD OF SCHEDULING COMPUTING THREADS

(75) Inventors: Peter Zenon Onufryk, Flanders, NJ (US); Inna Levit, Sunnyvale, CA (US)

(73) Assignee: Integrated Device Technology, inc., San Jose, CA (US)

( * ) Notice: Subject to any disclaimer, the term of this patent is extended or adjusted under 35 U.S.C. 154(b) by 1017 days.

(21) Appl. No.: 10/940,201

(22) Filed: Sep. 13, 2004

(65) Prior Publication Data

US 2006/0059485 A1 Mar. 16, 2006

(51) Int. Cl.
*G06F 9/46* (2006.01)

(52) U.S. Cl. ..................... 718/103; 718/102

(58) Field of Classification Search .......... 718/100, 718/102, 103; 709/240; 712/206, 245
See application file for complete search history.

(56) References Cited

U.S. PATENT DOCUMENTS

| | | | | |
|---|---|---|---|---|
| 4,612,418 A * | 9/1986 | Takeda et al. | ................ | 379/146 |
| 5,745,778 A * | 4/1998 | Alfieri | ................ | 712/1 |
| 5,835,764 A * | 11/1998 | Platt et al. | ................ | 718/101 |
| 5,848,257 A * | 12/1998 | Angle et al. | ................ | 712/219 |
| 5,887,166 A * | 3/1999 | Mallick et al. | ................ | 718/102 |
| 5,913,925 A * | 6/1999 | Kahle et al. | ................ | 712/206 |
| 6,076,157 A * | 6/2000 | Borkenhagen et al. | ................ | 712/228 |
| 6,133,864 A * | 10/2000 | Sabatini | ................ | 341/141 |
| 6,308,279 B1 | 10/2001 | Toll et al. | | |
| 6,507,862 B1 * | 1/2003 | Joy et al. | ................ | 718/107 |
| 6,697,935 B1 * | 2/2004 | Borkenhagen et al. | ................ | 712/228 |
| 6,785,889 B1 * | 8/2004 | Williams | ................ | 718/104 |
| 6,952,826 B1 * | 10/2005 | Smyers et al. | ................ | 718/102 |
| 6,965,986 B2 * | 11/2005 | Kossman et al. | ................ | 712/228 |
| 7,058,937 B2 * | 6/2006 | Fu et al. | ................ | 717/161 |
| 7,096,470 B2 * | 8/2006 | Brown et al. | ................ | 718/102 |
| 7,143,411 B2 * | 11/2006 | Circenis et al. | ................ | 718/102 |
| 7,320,065 B2 * | 1/2008 | Gosior et al. | ................ | 712/227 |
| 7,359,846 B1 * | 4/2008 | Fernandez | ................ | 703/13 |
| 2002/0161957 A1 * | 10/2002 | Comeau et al. | ................ | 710/260 |
| 2002/0174318 A1 * | 11/2002 | Stuttard et al. | ................ | 712/13 |
| 2004/0060052 A1 * | 3/2004 | Brown et al. | ................ | 718/107 |
| 2004/0187120 A1 * | 9/2004 | Moore et al. | ................ | 718/100 |
| 2004/0210697 A1 * | 10/2004 | Quach et al. | ................ | 710/260 |
| 2005/0149608 A1 * | 7/2005 | Sanjay | ................ | 709/200 |
| 2006/0059487 A1 * | 3/2006 | Chatterjee et al. | ................ | 718/100 |

(Continued)

OTHER PUBLICATIONS

Neihaus et al., "group scheduling in systems software", IEEE, Apr. 2004, pp. 1-8.*

(Continued)

*Primary Examiner*—Meng-Ai An
*Assistant Examiner*—Caroline Arcos
(74) *Attorney, Agent, or Firm*—Glass & Associates; Stanley J. Pawlik; Kenneth Glass

(57) ABSTRACT

A system and method for scheduling a thread identifies runnable threads based on precycle signals determined before the scheduling cycle. The thread indexes of the runnable threads are grouped according to the thread priorities of the runnable threads, and the thread indexes are ranked within each group. The runnable threads that will be runnable in the next scheduling cycle are identified based on same cycle signals determined during the scheduling cycle. The highest ranked thread index of the runnable threads that will also be runnable in the next scheduling cycle is selected as the scheduled thread.

14 Claims, 4 Drawing Sheets

U.S. PATENT DOCUMENTS

2006/0117316 A1* 6/2006 Cismas et al. ............... 718/103

OTHER PUBLICATIONS

Ungerer, T. et al., "A Survey of Processors with Explicit Multithreading," ACM Computing Surveys, Mar. 2003, pp. 29-63, vol. 35, No. 1.

Mazzucco, P., "Fundamentals of Multithreading," http://www.slcentral.com/articles/01/6/mutithreading/print.php, posted Jun. 15, 2001.

Cranor, C. et al., "Architectural Considerations for CPU and Network Interface Integration," IEEE Micro, Jan.-Feb. 2000, pp. 18-26, IEEE.

* cited by examiner

SYSTEM AND METHOD OF SCHEDULING COMPUTING THREADS

BACKGROUND

1. Field of the Invention

The present invention relates generally to multithreaded computing systems and methods. More particularly, the present invention relates to systems and methods of scheduling computing threads for processing in a multithreaded computing system.

2. Background Art

One type of multithreaded computing system includes a thread scheduler that schedules computing threads. Once a thread is scheduled, an instruction of the scheduled thread can issue to a pipelined processor for processing. The pipelined processor includes a sequence of stages, each of which performs a different operation on an instruction as the instruction sequences through the stages. Moreover, the pipelined processor can process multiple instructions at the same time, each of the instructions being in a different stage.

Maintaining a high throughput of the pipelined processor in this type of computing system generally depends upon scheduling a runnable thread during a scheduling cycle, and issuing an instruction of the scheduled thread to the first stage of the pipelined processor during the next scheduling cycle. Stated differently, the throughput of the pipelined processor is generally higher when each stage of the pipelined processor contains an instruction.

In some multithreaded computing systems, a runnable thread may become unrunnable after the thread scheduler schedules the thread but before an instruction of the scheduled thread is issued to the pipelined processor. This can occur, for example, when a thread is scheduled during a scheduling cycle, and a previously issued instruction of that thread causes the computing system to initiate a thread context switch. The thread context switch occurs during the next scheduling cycle. During this next scheduling cycle, however, an additional instruction of the scheduled thread is not issued to the pipelined processor because the scheduled thread is now unrunnable. Instead, another runnable thread is scheduled during this next scheduling cycle, and an instruction of this other thread issues to the pipelined processor in the following scheduling cycle. Accordingly, no instruction is issued to the pipelined processor during the scheduling cycle in which the thread context switch occurs. Consequently, the first stage of the pipelined processor becomes empty and thus the throughput of the pipelined processor is diminished.

In light of the above, there exists a need to improve thread scheduling in a way that avoids empty stages in a pipelined processor.

SUMMARY OF THE INVENTION

A two-stage thread scheduler addresses the need to improve thread scheduling by avoiding empty stages from occurring in a pipelined processor. The first stage of the thread scheduler ranks thread indexes of threads that are runnable at the start of the scheduling cycle. During the scheduling cycle, the second stage of the thread scheduler selects the highest ranked thread index of the runnable thread that will be runnable during the next scheduling cycle. In this way, an instruction of the selected thread can issue to a pipelined processor during this next scheduling cycle, thus avoiding empty stages in the pipelined processor.

In one embodiment of a method in accordance with the present invention, a lead thread index of a runnable thread and an alternative thread index of another runnable thread are identified based on precycle signals. The lead thread index or the alternative thread index is then selected based on one or more same cycle signals determined during the scheduling cycle. The thread having the selected thread index is runnable during the next scheduling cycle.

In another embodiment of a method in accordance with the present invention, one or more runnable thread indexes are identified based on one or more precycle signals. Each of the runnable thread indexes identifies a thread being runnable at the start of a scheduling cycle. Each runnable thread index is ranked based on one or more precycle signals and a ranking algorithm. A highest ranked runnable thread index identifying a thread being runnable in a next scheduling cycle is selected based on one or more same cycle signals determined during the scheduling cycle.

In one embodiment of a system in accordance with the present invention, a thread ranking module identifies both a lead thread index of a runnable thread and an alternative thread index of another runnable thread based on precycle signals. A thread selector then selects either the lead thread index or the alternative thread index based on one or more same cycle signals determined during the scheduling cycle. The thread having the selected thread index is runnable during the next scheduling cycle.

In another embodiment of a system in accordance with the present invention, a runnable thread identification module identifies one or more runnable thread indexes based on one or more precycle signals. Each runnable thread index identifies a thread being runnable at the start of a scheduling cycle. A runnable thread ranking module ranks each runnable thread index based on one or more precycle signals and a ranking algorithm. A thread selector selects a highest ranked runnable thread index identifying a thread being runnable in a next scheduling cycle, based on one or more same cycle signal determined during the scheduling cycle.

In one embodiment of a computer program product in accordance with the present invention, the computer program product includes computer program code for identifying a lead thread index of a runnable thread based on precycle signals. The computer program product also includes computer program code for identifying an alternative thread index of another runnable thread based on the precycle signals. Additionally, the computer program product includes computer program code for selecting either the lead thread index or the alternative thread index during the scheduling cycle, based on one or more same cycle signals determined during the scheduling cycle. The thread having the selected thread index is runnable during the next scheduling cycle.

DETAILED DESCRIPTION OF THE EMBODIMENTS

In accordance with the present invention, a thread scheduler ranks thread indexes of threads that are runnable at the beginning of a scheduling cycle according to a thread selection scheme. One or more events that can occur during the scheduling cycle, however, can cause one or more of the runnable threads to be unrunnable in the next scheduling cycle. The thread scheduler selects the highest ranked thread index of a runnable thread that will be runnable in the next scheduling cycle.

Figure 1:
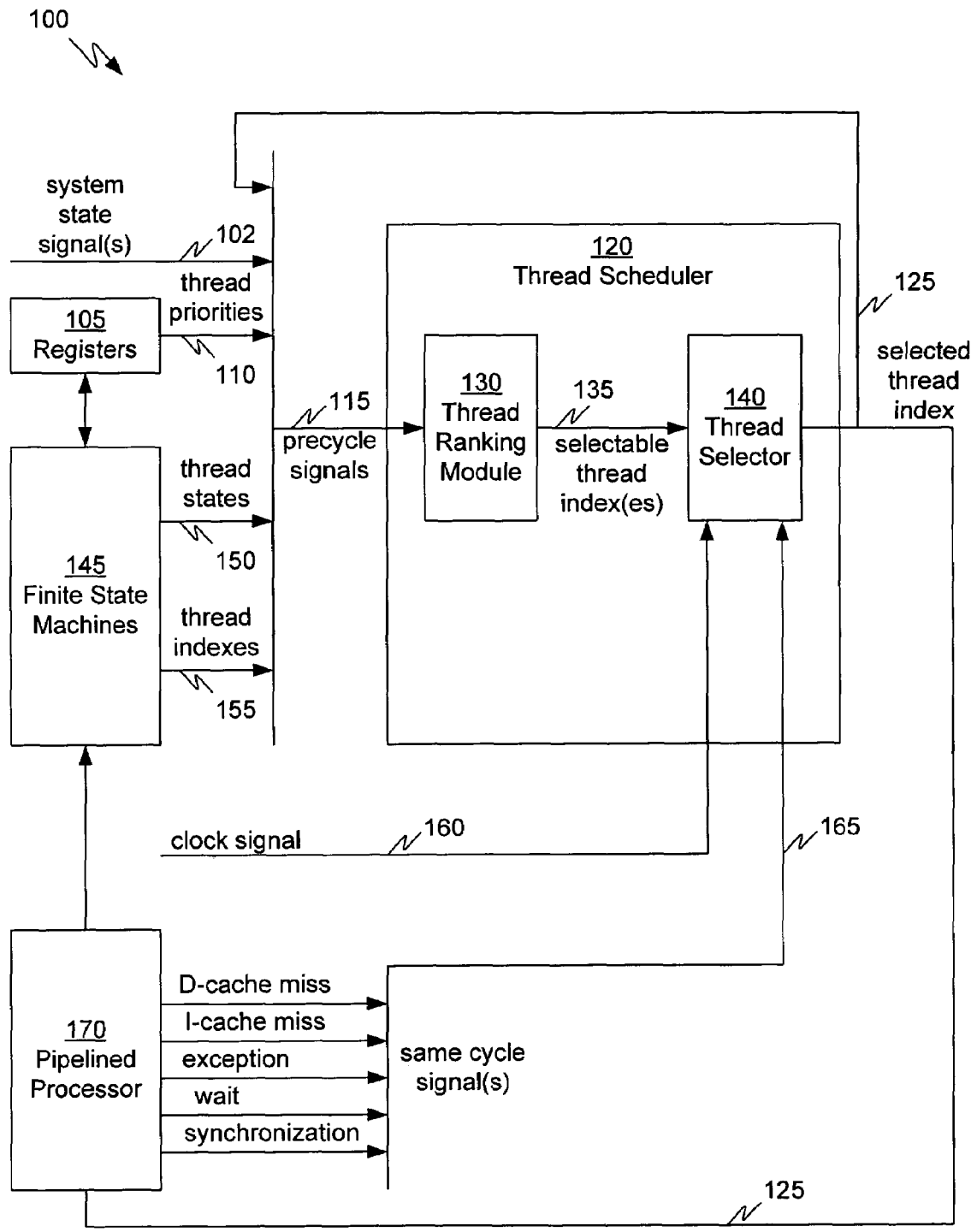
FIG. 1 is a block diagram of an exemplary computing environment in which a thread scheduler in accordance with the present invention can be practiced.

FIG. 1 depicts a block diagram of an exemplary computing environment 100 in which a thread scheduler 120 in accordance with the present invention can be practiced. The exemplary computing environment 100 includes registers 105, finite state machines 145, and a pipelined processor 170. The registers 105 store information for threads (i.e., computing threads) in the exemplary computing environment 100, as is described more fully herein. Each of the finite state machines 145 is dedicated to a thread (e.g., a hardware computing thread) and maintains the state of the thread. The thread scheduler 120 schedules threads and the pipelined processor 170 processes scheduled threads, as is described more fully herein. It is to be appreciated that the exemplary computing environment 100 can include other components, such as a memory system or a bus controller, as would be appreciated by one skilled in the art.

The thread scheduler 120 includes a thread ranking module 130 and a thread selector 140. The thread ranking module 130 identifies runnable threads (i.e., threads in a runnable state) and ranks the thread indexes 155 of the runnable threads to generate selectable thread index(es) 135 based on one or more precycle signals 115, as is described more fully herein. The thread selector 140 receives the selectable thread index(es) 135 from the thread ranking module 130 and selects one of the selectable thread index(es) 135 as a selected thread index 125 based on a clock signal 160 and one or more same cycle signal(s) 165, as is described more fully herein.

In one embodiment, the selected thread index 125 identifies a scheduled thread. In this embodiment, the thread scheduler 140 provides the selected thread index 125 to the pipelined processor 170. In turn, the pipelined processor 170 processes thread instructions of the thread identified by the selected thread index 125.

In one embodiment, the thread ranking module 130 is a hardware module. In another embodiment, the thread selector 140 is a hardware module. Examples of a hardware module include a combinational logic circuit, a sequential logic circuit, a programmable logic device, and a computing device, among others.

In one embodiment, the thread ranking module 130 is a software module. In another embodiment, the thread selector 140 is a software module. Examples of a software module include a computer program, a software routine, binary code, and firmware, among others. Another example of a software module is a computer program product, such as a compact disc read-only memory (CD-ROM) or a memory storage device, containing computer program code.

In one embodiment, the thread ranking module 130 is a computing process that executes computer program code to generate the selectable thread index(es) 135 based on the precycle signals 115. In another embodiment, the thread selector 140 is a computing process that executes computer program code to select the selected thread index 125 based on the selectable thread index(es) 135, the clock signal 160, and the same cycle signal(s) 165.

In one embodiment, the registers 105 provide the precycle signals 115 to the thread ranking module 130. In this embodiment, the precycle signals 115 include thread priorities 110, thread states 150, and thread indexes 155 of threads in the computing environment 100. In a further embodiment, the precycle signals 115 also include the most recently selected thread index 125 (i.e., the currently selected thread index 125). In another embodiment, the registers 105 in combination with the finite state machines 145 provide the precycle signals to the thread ranking module 130. In this embodiment, the registers 105 provide the thread priorities 110 to the thread ranking module 130 and the finite state machines 145 provide the thread states 150 and the thread indexes 155 to the thread ranking module 130.

In another embodiment, the precycle signals 115 include one or more system state signal(s) 102, each of which indicates a system state of the computing environment 100 or the thread scheduler 120. For example, a system state signal 102 can indicate a hardware state of the thread scheduler 120, the finite state machines 145, or the pipelined processor 170. As a further example, the system state signal 102 can indicate whether the thread scheduler 120 has issued a selected thread index 125 to the pipelined processor 170 during a scheduling cycle or whether the pipelined processor 170 is stalled.

In another embodiment, a system state signal 102 can indicate a hardware state of a cache controller (not shown) or a bus controller (not shown) in the computing environment 100. For example, the system state signal 102 can be the value of a counter or a register in the bus controller (not shown), which indicates the status of the bus controller (e.g., busy).

The thread states 150 each indicate a state of one of the threads. In one embodiment, an instruction of a thread can be issued to the pipelined processor 170 when the thread state 150 of the thread is runnable. In this embodiment, an instruction of a thread is not issued to the pipelined processor 170 when the thread state 150 of the thread is unrunnable (e.g., disabled, suspended, or waiting).

In the exemplary computing environment 100, finite state machines 145, one for each thread, provide the thread states 150 of the threads to the thread ranking module 130. It is to be understood that another source can provide the thread states 150 to the thread ranking module 130. For example, the finite state machines 145 can provide the thread states 150 to the registers 105, and in turn the registers 105 can provide the thread states 150 to the thread ranking module 130.

The thread indexes 155 each identify a different thread that the pipelined processor 170 can process. In one embodiment, each of the thread indexes 155 identifies a different hardware thread. Although the finite state machines 145 provide the thread indexes 155 to the thread ranking module 130 in the exemplary computing environment 100, it is to be understood that another source can provide the thread indexes 155 to the thread ranking module 130. For example, the thread indexes 155 can be inherent in the thread priorities 110 or thread states 150, or both.

The thread priorities 110 each indicate a priority for processing a thread in the pipelined processor 170. In the exemplary computing environment 100, each of the threads in the exemplary computing environment 100 has a thread priority 110. Although the registers 105 provide the thread priorities 110 to the thread ranking module 130 in the exemplary computing environment 100, it is to be understood that another source can provide the thread priorities 110 to the thread ranking module 130.

The clock signal 160 establishes scheduling cycles for the thread scheduler 120. In one embodiment, the clock signal 160 establishes periodic scheduling cycles, as would be appreciated by one skilled in the art. In this embodiment, the thread scheduler 120 can generate a selected thread index 125 during each scheduling cycle.

The same cycle signal(s) 165 indicate events that can occur during a scheduling cycle to cause a thread to become unrunnable (e.g., cause the thread to transition from a runnable state to an unrunnable state). Examples of a same cycle signal 165 include a data cache (D-cache) miss, an instruction cache (I-cache) miss, and an instruction exception, which are generated by the pipelined processor 170. Other examples of a same cycle signal 165 include a wait on a multiply-divide unit to complete an operation (i.e., wait on arithmetic operation), or a synchronization instruction that suspends a thread until a synchronization event is complete (i.e., instruction synchronization).

Figure 2:
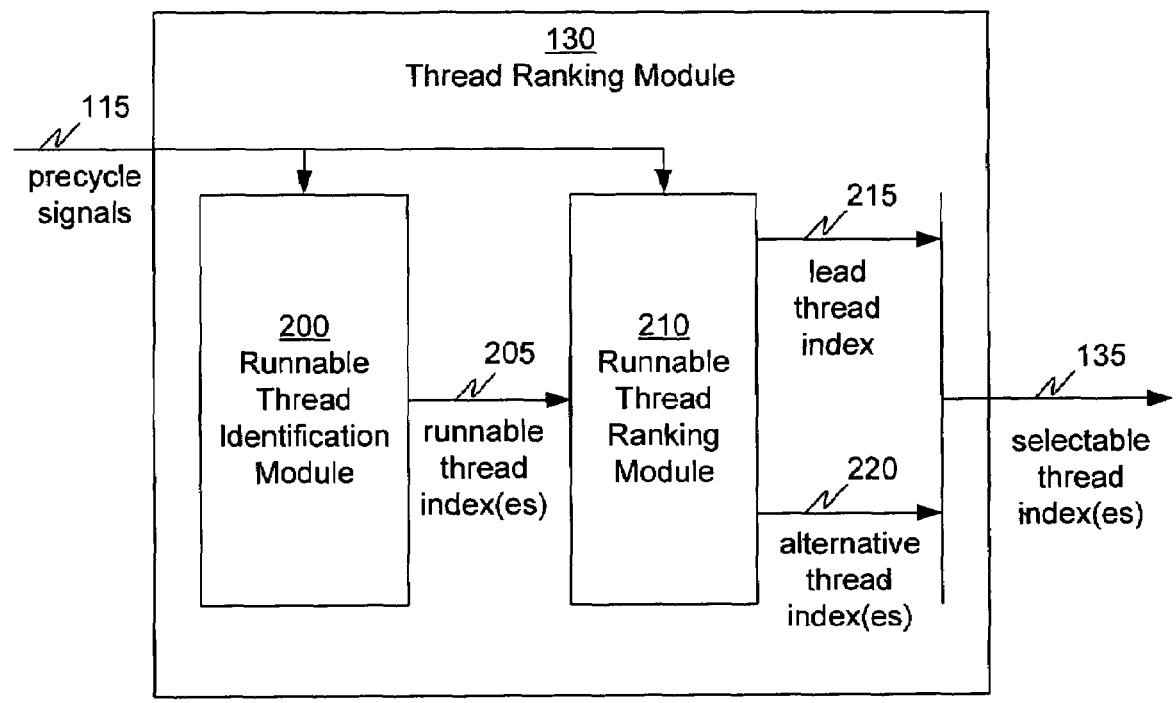
FIG. 2 is a block diagram of a thread ranking module, in accordance with one embodiment of the present invention.

Referring now to FIG. 2, an exemplary embodiment of the thread ranking module 130 is shown. The thread ranking module 130 includes a runnable thread identification module 200 and a runnable thread ranking module 210. The runnable thread identification module 200 identifies runnable threads and generates runnable thread index(es) 205, based on the precycle signals 115. The runnable thread ranking module 210 ranks the runnable thread index(es) 205, based on the precycle signals 115, to generate the selectable thread index (es) 135, as is described more fully herein.

In one embodiment, the runnable thread identification module 200 identifies the runnable threads based on the thread states 150 (FIG. 1). In this embodiment, the runnable thread identification module 200 identifies those threads that are in a runnable state at the start of a scheduling cycle established by the clock signal 160 (FIG. 1). As such, the runnable thread identification module 200 generates the runnable thread index(es) 205, which are the thread indexes 155 (FIG. 1) of the identified runnable threads.

In one embodiment, the runnable thread ranking module 210 groups the runnable thread index(es) 205 into priority groups based on the thread priorities 110 (FIG. 1), and then ranks the runnable thread index(es) 205 within each priority group based on a ranking algorithm to generate the selectable thread index(es) 135. For example, the ranking algorithm can establish an order for any runnable thread index(es) 205 within each priority group according to a fixed priority of the runnable thread index(es) 205 or a round robin ranking of the runnable thread index(es) 205. As another example, the ranking algorithm can establish an order for any runnable thread index(es) 205 within each priority group according to a weighted priority of the runnable thread index(es) 205 based on one or more characteristics of the threads (e.g., system state signals 102). It is to be appreciated that the ranking algorithm can be any ranking algorithm known to those skilled in art.

In this embodiment, each priority group has a priority that is the same as a thread priority 110 of a runnable thread having a runnable thread index 205 in the priority group. By grouping the runnable thread index(es) 205 into priority groups and ranking the runnable thread index(es) 205 within each priority group, the runnable thread ranking module 210 establishes an order for the runnable thread index(es) 205. As such, the selectable thread index(es) 135 are the ordered runnable thread index(es) 205.

Further, in this embodiment, the runnable thread ranking module 210 identifies the priority group having the highest priority as the highest priority group, and the runnable thread index 205 ranked highest within the highest priority group as a lead thread index 215. Additionally, the runnable thread ranking module 210 identifies the runnable thread index(es) 205 other than the lead thread index 215 as alternative thread index(es) 220. In this embodiment, the lead thread index 215 and the alternative thread index(es) 220 are the selectable thread index(es) 135, and the lead thread index 215 is the highest ranked selectable thread index 135.

In a further embodiment, the runnable thread ranking module 210 identifies the highest priority group that includes at least one runnable thread index 205 other than the lead thread index 215. In this embodiment, the runnable thread ranking module 210 identifies the highest ranked runnable thread index 205 in this highest priority group, other than the lead thread index 215, as the highest ranked alternative thread index 220.

In one embodiment, the runnable thread ranking module 210 uses a predetermined circular sequence of the thread indexes 155 (FIG. 1) to rank the runnable thread index(es) 205 within each priority group based on the ranking algorithm. The predetermined circular sequence provides a ranking order for the thread indexes 155. In this embodiment, the runnable thread ranking module 210 uses the most recently selected thread index 125 (i.e., the currently selected thread index 125) to select the next thread index 155 in the predetermined circular sequence that is to be ranked.

For example, the predetermined circular sequence can include the thread indexes 155 (FIG. 1) represented by the numerals "000", "001", "010", "011", and "100." In this example, the thread indexes 155 in the predetermined circular sequence are ordered in numerical sequence with the first thread index 155 (i.e., "000") following the last thread index 155 (i.e., "100"). Accordingly, the sequence of thread indexes 155 in the predetermined circular sequence is circular.

Further, in this example, the most recently selected thread index 125 (FIG. 1) is represented by the numeral "010", and the thread indexes 155 represented by the numerals "000" and "100" are runnable thread indexes 205 in the highest priority group. In this example, the runnable thread ranking module 210 identifies the highest priority group containing a runnable thread index 205 (e.g., "000" or "100"). The thread ranking module 210 then identifies the thread index 155 (FIG. 1) represented by the numeral "100" as the lead thread index 215 because this thread index 155 is the runnable thread index 205 in the highest priority group that first follows the most recently selected thread index 125 (i.e., "010") in the predetermined circular sequence.

Additionally, in this example, the runnable thread ranking module 210 identifies the same priority group as the highest priority group containing at least one alternative thread index 155. The runnable thread ranking module 210 then identifies the thread index 155 represented by the numeral "000" as the highest ranked alternative thread index 220 because this thread index 155 is the runnable thread index 205 in the highest priority group other than the lead thread index 215 that next follows the most recently selected thread index 125 (i.e., "010") in the predetermined circular sequence. In this example, the runnable thread ranking module 210 does not select the thread index 115 represented by the numeral "011" because this thread index 115 is either unrunnable or is in another priority group. Further, in this example, the runnable thread ranking module 210 repeats this ranking process until each runnable thread index 205 in the highest priority group is ranked. In a further embodiment, the runnable thread ranking module 210 repeats this ranking process for any remaining priority groups in order of priority.

As another example, the predetermined circular sequence can include the thread indexes 155 (FIG. 1) represented by the numerals "000", "001", "010", "011", and "100." In this example, the most recently selected thread index 125 (FIG. 1) is represented by the numeral "010", the thread index 115 represented by the numeral "011" is not a runnable thread index 205, the thread index 115 represented by the number "000" is a runnable thread index 205 is the highest priority group, and the thread indexes 115 represented by the numerals "100" and "001" are runnable thread indexes 205 in a second highest priority group (i.e., a lower priority group). In this example, the runnable thread ranking module 210 identifies the thread index 155 (FIG. 1) represented by the numeral "000" as the lead thread index 215 because this thread index 155 is the runnable thread index 205 in the highest priority group that first follows the most recently selected thread index 125 (i.e., "010") in the predetermined circular sequence.

Additionally, in this example, the runnable thread ranking module 210 identifies a highest ranked priority group containing at least one alternative thread index 155. The runnable thread ranking module 210 then identifies the thread index 155 represented by the numeral "100" as the highest ranked alternative thread index 220 within this highest priority group because this thread index 155 is the runnable thread index 205 within this highest priority group other than the lead thread index 215 that next follows the most recently selected thread index 125 (i.e., "010") in the predetermined circular sequence. In this example, the runnable thread ranking module 210 does not select the thread index 115 represented by the numeral "011" because this thread index 115 is unrunnable. Further, in this example, the runnable thread ranking module 210 repeats the ranking process until each runnable thread index 205 in this highest priority group is ranked, and repeats this ranking process for any remaining priority groups in order of group priority.

In an alternative embodiment, the ranking algorithm is a round robin algorithm. In this embodiment, the runnable thread ranking module 210 ranks the runnable thread index (es) 205 according to the priority groups and ranks the runnable thread index(es) 205 within each priority group based on the predetermined circular sequence. In this alternative embodiment, however, the runnable thread ranking module 210 stores the most recently selected thread index 125 from each priority group and ranks the thread index(es) 155 within each priority group based on the most recently selected thread index 125 for that priority group instead of the currently selected thread index 125.

Figure 3:
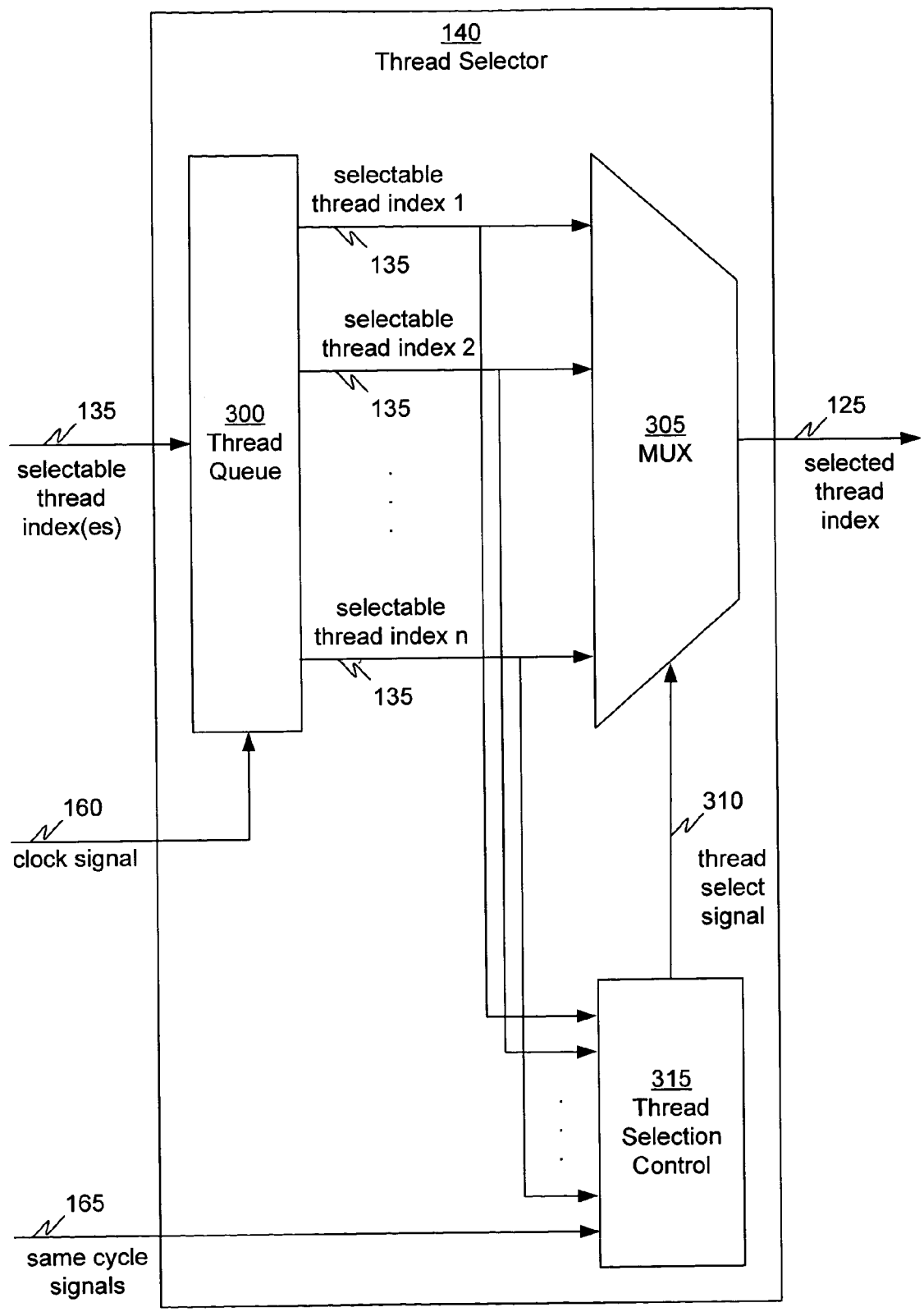
FIG. 3 is a block diagram of a thread selector, in accordance with one embodiment of the present invention.

Referring now to FIG. 3, an exemplary thread selector 140 is shown. The thread selector 140 includes a thread queue 300, a multiplexer (MUX) 305, and a thread selection control 315. The thread queue 300 receives the selectable thread index(es) 135 from the thread ranking module 130 (FIG. 1) and the clock signal 160 (FIG. 1), and stores the selectable thread index(es) 135 according to the ranking of the selectable thread index(es) 135 established by the thread ranking module 130. In one embodiment, the thread queue 300 stores the selectable thread index(es) 135 at the start of a scheduling cycle established by the clock signal 160 (e.g., a rising edge of the clock signal 160). Additionally, the thread queue 300 outputs the selectable thread index(es) 135 to the multiplexer 305 and the thread selection control 315.

In another embodiment, the thread queue 300 can store a predetermined number of selectable thread index(es) 135. In this embodiment, the thread queue 300 receives the highest ranked selectable thread index(es) 135 from the thread ranking module 130 (FIG. 1) up to the predetermined number, and stores the highest ranked selectable thread index(es) 135. In one further embodiment, the thread queue 300 can store a selectable thread index 135 for each thread in the computing environment 100. In this embodiment, the predetermined number of selectable thread indexes 135 that the thread queue 300 can store is equal to the number of threads (e.g., hardware threads) in the computing environment 100. In another further embodiment, the thread queue 300 can store a selectable thread index 135 for each thread being processed by the pipelined processor 170. In this embodiment, the predetermined number of selectable thread indexes 135 that the thread queue 300 can store is equal to a predetermined number of stages in the pipelined processor 170.

The multiplexer 305 passes one of the selectable thread index(es) 135 stored in the thread queue 300 as the selected thread index 125, based on a thread select signal 310. The thread selection control 315 generates the thread select signal 310 based on the selectable thread index(es) 135 received from the thread queue 300 and the same cycle signal(s) 165. The same cycle signal(s) 165 indicate whether a selectable thread index 135 will be runnable in the next scheduling cycle, as is described more fully herein. The thread selection control 315 generates the thread select signal 310 so that the multiplexer 305 will pass the highest ranked selectable thread index 135 of the thread that will be runnable in the next scheduling cycle as the selected thread index 125.

Figure 4:
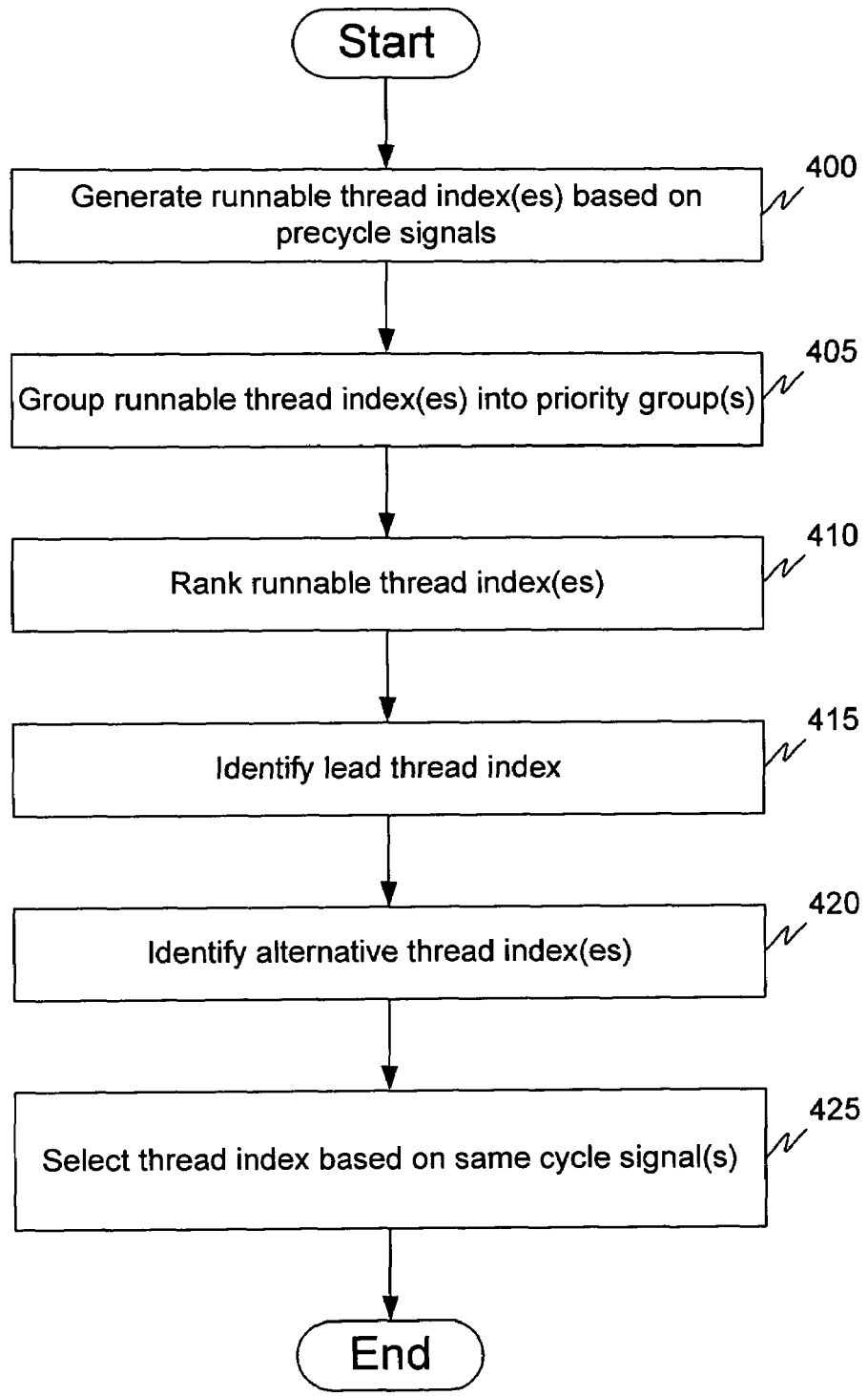
FIG. 4 is a flow chart for a method of scheduling a thread, in accordance with one embodiment of the present invention.

Referring now to FIG. 4, a flow chart of a method for scheduling a thread, in accordance with the present invention, is shown. In step 400, the runnable thread identification module 200 (FIG. 2) identifies one or more runnable threads and generates the runnable thread index(es) 205 based on the precycle signals 115. In one embodiment, the runnable thread identification module 200 identifies any runnable threads based on the thread states 150 (FIG. 1) of the threads at the start of a scheduling cycle established by the clock signal 160, as is described more fully herein.

In step 405, the runnable thread ranking module 210 (FIG. 2) groups the runnable thread index(es) 205 of any identified runnable thread(s) into priority group(s). In one embodiment, each priority group has a priority that is the same as a thread priority 110 of a runnable thread having a runnable thread index 205 in the priority group.

In step 410, the runnable thread ranking module 210 (FIG. 2) ranks the runnable thread index(es) 205, based on one or more precycle signals 115 and a ranking algorithm, to generate the selectable thread index(es) 135. In one embodiment, the runnable thread ranking module 210 ranks the runnable thread index(es) 205 according to the priority groups such that any runnable thread index 205 in a higher priority group is ranked higher than any runnable thread index 205 is a lower priority group. In this embodiment, the runnable thread ranking module 210 also ranks the runnable thread index(es) 205 within each priority group, based on the ranking algorithm. In another embodiment, the runnable thread ranking module 210 uses a predetermined circular sequence of the thread indexes 155 (FIG. 1) to rank the runnable thread index(es) 205 within the priority groups based on the ranking algorithm, as is described more fully herein. In a further embodiment, the ranking algorithm is a round robin algorithm. In this further embodiment, the runnable thread ranking module 210 ranks the runnable thread index(es) 205 within each priority group based on a round robin ranking order, as is described more fully herein.

In step 415, the runnable thread ranking module 210 (FIG. 2) identifies a runnable thread index 205 in the highest priority group as the lead thread index 215. In one embodiment, the runnable thread ranking module 210 first identifies the priority group having the highest priority as the highest priority group, as is described more fully herein. In this embodiment, the lead thread index 215 is the runnable thread index 205 in the highest priority group that is ranked highest within the priority group based on the ranking algorithm. In a further embodiment, the lead thread index 215 is the runnable thread index 205 in the highest priority group that first follows a most recently selected thread index 125 in a predetermined circular sequence, as is described more fully herein.

In step 420, the runnable thread ranking module 210 (FIG. 2) identifies any runnable thread index(es) 205 other than the lead thread index 215 as alternative thread index(es) 220. In one embodiment, the runnable thread ranking module 210 identifies a highest priority group containing at least one alternative thread index 220. In this embodiment, the runnable thread ranking module 210 ranks any alternative thread index(es) 220 in this highest priority group, based on a ranking algorithm (e.g., a round robin algorithm). Additionally, the runnable thread ranking module 210 identifies one alternative thread index 220 in this highest priority group as the highest ranked alternative thread index 220, based on the ranking algorithm. In a further embodiment, the highest ranked alternative thread index 220 is the runnable thread index 205 in this highest priority group other than the lead thread index 215 that first follows a most recently selected thread index 125 in the predetermined circular sequence, as is described more fully herein.

In step 425, the thread selector 140 (FIG. 1) selects as the selected thread index 125 the highest ranked selectable thread index 135 of the thread that will be runnable in the next scheduling cycle, based on the same cycle signal(s) 165. In one embodiment, the thread selection control 315 (FIG. 3) of the thread selector 140 generates a thread select signal 310 based on the same cycle signal(s) 165, and the multiplexer 305 passes one of the selectable thread index(es) 135 stored in the thread queue 300 as the selected thread index 125 based on the thread select signal 310, as is described more fully herein.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of scheduling a computing thread, the method comprising:
    identifying a lead thread index of a thread from a plurality of threads before a start of a scheduling cycle based on a plurality of precycle signals that indicate thread states of the plurality of threads, the precycle signals indicating whether each thread of the plurality of threads will be runnable at the start of the scheduling cycle, the thread identified by the lead thread index being runnable at the start of the scheduling cycles, wherein the scheduling cycle is a clock cycle of a clock signal and the start of the scheduling cycle is established by an edge of the clock signal;
    identifying an alternative thread index of another thread from the plurality of threads before the start of the scheduling cycle based on the plurality of precycle signals, the thread identified by the alternative thread index being runnable at the staff of the scheduling cycle, the lead thread index being ranked higher than the alternative thread index; and
    selecting either the lead thread index or the alternative thread index as a selected thread index in the scheduling cycle, based on a same cycle signal received in the scheduling cycle indicating whether the thread identified by the lead thread index has become unrunnable in the scheduling cycle, the thread identified by the selected thread index being a highest ranked thread index being runnable at an end of the scheduling cycle, wherein the same cycle signal indicates a cache miss occurring in a pipelined processor or an instruction exception occurring in the pipelined processor or a wait on arithmetic operation occurring in the pipelined processor or an instruction synchronization occurring in the pipelined processor.

2. A system for scheduling a computing thread, the system comprising:
    a pipelined processor;
    a thread ranking module configured to identify both a lead thread index of a thread and an alternative thread index of another thread from a plurality of threads before a start of a scheduling cycle, based on a plurality of precycle signals that indicate thread states of the plurality of threads, the precycle signals indicating whether each thread of the plurality of threads will be runnable at the staff of the scheduling cycle, both the thread identified by the lead thread index and the thread identified by the alternative thread index being runnable at the start of the scheduling cycle, the lead thread index being ranked higher than the alternative thread index, wherein the scheduling cycle is a clock cycle of a clock signal and the start of the scheduling cycle is established by an edge of the clock signal; and
    a thread selector configured to select either the lead thread index or the alternative thread index as a selected thread index in the scheduling cycle, based on a same cycle signal received in the scheduling cycle indicating whether the thread identified by the lead thread index has become unrunnable in the scheduling cycle, the thread identified by the selected thread index being a highest ranked thread index being runnable at an end of the scheduling cycle, wherein the same cycle signal indicates a cache miss occurring in the pipelined processor or an instruction exception occurring in the pipelined processor or a wait on arithmetic operation occurring in the pipelined processor or an instruction synchronization occurring in the pipelined processor.

3. A storage device storing a computer program product including computer program code for performing a method comprising:
    identifying a lead thread index of a thread from a plurality of threads before a start of a scheduling cycle based on a plurality of precycle signals that indicate thread states of the plurality of threads, the precycle signals indicating whether each thread of the plurality of threads will be runnable at the start of the scheduling cycle, the thread identified by the lead thread index being runnable at the start of the scheduling cycles wherein the scheduling cycle is a clock cycle of a clock signal and the start of the scheduling cycle is established by an edge of the clock signal;
    identifying an alternative thread index of another thread from the plurality of threads before the start of the scheduling cycle based on the plurality of precycle signals, the thread identified by the alternative thread index being runnable at the start of the scheduling cycle, the lead thread index being ranked higher than the alternative thread index; and
    selecting either the lead thread index or the alternative thread index as a selected thread index in the scheduling cycle, based on a same cycle signal received in the scheduling cycle indicating whether the thread identified by the lead thread index has become unrunnable in the scheduling cycle, the thread identified by the selected thread index being a highest ranked thread index being runnable at an end of the scheduling cycle, wherein the same cycle signal indicates a cache miss occurring in a pipelined processor or an instruction exception occurring in the pipelined processor or a wait on arithmetic operation occurring in the pipelined processor or an instruction synchronization occurring in the pipelined processor.

4. A system for scheduling a computing thread, the system comprising:
a pipelined processor;
means for identifying a lead thread index of a thread from a plurality of threads before a start of a scheduling cycle based on a plurality of precycle signals that indicate thread states of the plurality of threads, the precycle signals indicating whether each thread of the plurality of threads will be runnable at the start of the scheduling cycle, the thread identified by the lead thread index being runnable at the start of the scheduling cycle, wherein the scheduling cycle is a clock cycle of a clock signal and the start of the scheduling cycle is established by an edge of the clock signal;
means for identifying an alternative thread index of another thread from the plurality of threads before the start of the scheduling cycle based on the plurality of precycle signals, the thread identified by the alternative thread index being runnable at the start of the scheduling cycle, the lead thread index being ranked higher than the alternative thread index; and
means for selecting either the lead thread index or the alternative thread index as a selected thread index in the scheduling cycle, based on a same cycle signal received in the scheduling cycle indicating whether the thread identified by the lead thread index has become unrunnable in the scheduling cycle, the thread identified by the selected thread index being a highest ranked thread index being runnable at an end of the scheduling cycle, wherein the same cycle signal indicates a cache miss occurring in the pipelined processor or an instruction exception occurring in the pipelined processor or a wait on arithmetic operation occurring in the pipelined processor or an instruction synchronization occurring in the pipelined processor.

5. The method of claim 1, further comprising:
storing the lead thread index and the alternative thread index in the scheduling cycle in response to the edge of the clock signal; and
outputting the selected thread index in the scheduling cycle in response to the edge of the clock signal.

6. The method of claim 1, further comprising a pipelined processor coupled to the thread selector, wherein the thread selector is further configured to issue the selected thread index to the pipelined processor for processing the thread identified by the selected thread index.

7. The method of claim 1, wherein identifying the lead thread index is performed in a thread ranking module, identifying the alternative thread index is performed in the thread ranking module, selecting either the lead thread index or the alternative thread index as the selected thread index is performed in a thread selector coupled to the thread ranking module, the thread ranking module is a hardware module, and the thread selector is a hardware module.

8. The system of claim 2, wherein the thread selector is further configured to store the lead thread index and the alternative thread index in the scheduling cycle in response to the edge of the clock signal and output the selected thread index in the scheduling cycle in response to the edge of the clock signal.

9. The system of claim 2, wherein the pipelined processor is coupled to the thread selector, wherein the thread selector is further configured to issue the selected thread index to the pipelined processor for processing the thread identified by the selected thread index.

10. The storage device of claim 3, wherein the method further comprises:
storing the lead thread index and the alternative thread index in the scheduling cycle in response to the edge of the clock signal; and
outputting the selected thread index in the scheduling cycle in response to the edge of the clock signal.

11. The storage device of claim 3, wherein the method further comprises issuing the selected thread index to the pipelined processor for processing the thread identified by the selected thread index.

12. The storage device of claim 3, wherein identifying the lead thread index is performed in a thread ranking module, identifying the alternative thread index is performed in the thread ranking module, selecting either the lead thread index or the alternative thread index as the selected thread index is performed in a thread selector, the thread ranking module is a software module, and the thread selector is a software module.

13. The system of claim 4, further comprising:
means for storing the lead thread index and the alternative thread index in the scheduling cycle in response to the edge of the clock signal; and
means for outputting the selected thread index in the scheduling cycle in response to the edge of the clock signal.

14. The system of claim 4, wherein the pipelined processor is coupled to the thread selector, the system further comprising:
means for issuing the selected thread index to the pipelined processor for processing the thread identified by the selected thread index.

* * * * *

UNITED STATES PATENT AND TRADEMARK OFFICE
CERTIFICATE OF CORRECTION

| | | |
|---|---|---|
| PATENT NO. | : 7,634,774 B2 | Page 1 of 1 |
| APPLICATION NO. | : 10/940201 | |
| DATED | : December 15, 2009 | |
| INVENTOR(S) | : Onufryk et al. | |

It is certified that error appears in the above-identified patent and that said Letters Patent is hereby corrected as shown below:

Column 9, Line 61 the word "staff" should read --start--.

Column 10, Line 21 the word "staff" should read --start--.

Signed and Sealed this

Sixth Day of April, 2010

David J. Kappos
*Director of the United States Patent and Trademark Office*